UNITED STATES PATENT OFFICE.

JOHN W. WHITE, OF WISNER, NEBRASKA.

COMPOSITION FOR PROTECTING GROWING PLANTS.

SPECIFICATION forming part of Letters Patent No. 698,345, dated April 22, 1902.

Application filed November 19, 1901. Serial No. 82,840. (No specimens.)

*To all whom it may concern:*

Be it known that I, JOHN W. WHITE, a citizen of the United States, and a resident of Wisner, in the county of Cuming and State of Nebraska, have invented a new and useful Composition of Matter for Protecting Growing Plants, of which the following is a full, clear, and exact description.

My invention relates to a composition of matter to be used for protecting young plants, trees, buds, &c., from the attacks of insects, rabbits, and the like and also for strengthening the young plants and protecting the same against storms and droughts. My composition also acts as a mulch in protecting the rootlets of young trees. The composition, together with the wrapping used therefor, also acts as a local protection for the roots of trees of any age from the direct rays of the sun and from frost. It also tends to prevent the scalding and cracking of bark, thus preventing early decay and rot, which is so common in the changeable climates of the southwest. I find that my composition is especially good in protecting apple, cherry, pear, and plum trees from the attacks of such insects as cause sap-poisoning.

The preparation consists of the following ingredients, to wit: ordinary clay, (alumina,) one hundred and twenty-eight ounces; common salt, one ounce; eucalyptus fluid, one pint; naphthalene moth-balls, twenty-four. The ingredients should be thoroughly pulverized and mixed together with sufficient water to make a paste and then spread upon thin cotton cloth cut in strips to suit the size of the tree.

The eucalyptus fluid referred to consists of eucalyptus-oil dissolved in alcohol, preferably two parts of oil to fourteen of alcohol, by weight.

The mixture can be applied to young plants or trees of any age without fear of injuring the stock. When the mixture is applied to trees, the outer edge of the wrapper is preferably fastened by applying thereto a mixture composed of resin and linseed-oil in the proportion of three parts of resin to one part of linseed-oil melted together. In the treatment of large trees a trowel is used to scrape off the rough bark and take out borers or other insects before applying the mixture. I find that trees treated with my composition quickly heal and take on a new growth. In applying the mixture to large trees a good plan is to clear away the dirt from the base of the tree, apply the mixture, and then replace the dirt.

In many instances and particularly where rabbits are troublesome it may be desirable to provide a crib or box, which not only offers a physical protection directly to the roots of the tree, but prevents disarrangement of the composition and of the means for securing the same in position.

Having thus described my invention, I claim as new and desire to secure by Letters Patent—

1. The herein-described composition of matter, comprising clay one hundred and twenty-eight ounces, common salt one ounce, eucalyptus fluid one pint and naphthalene moth-balls, twenty-four.

2. The herein-described composition of matter, comprising ordinary clay, common salt, eucalyptus fluid and naphthalene.

In testimony whereof I have signed my name to this specification in the presence of two subscribing witnesses.

JOHN W. WHITE.

Witnesses:
WM. EMLEY,
E. C. KINZEL.